Aug. 6, 1957  J. W. CROWNOVER  2,802,147
ELECTROSTRICTIVE CAPACITIVE RELAY FLASHER CIRCUIT
Filed Aug. 30, 1954
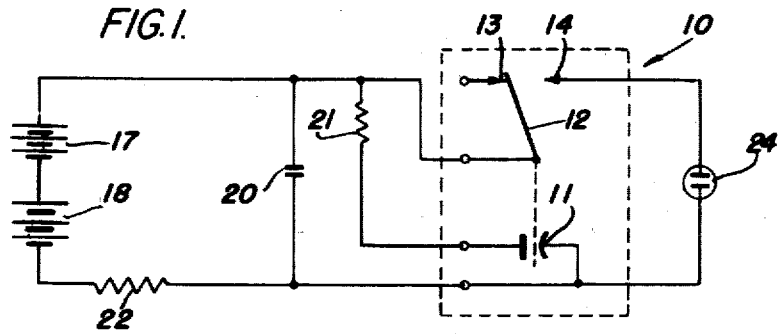
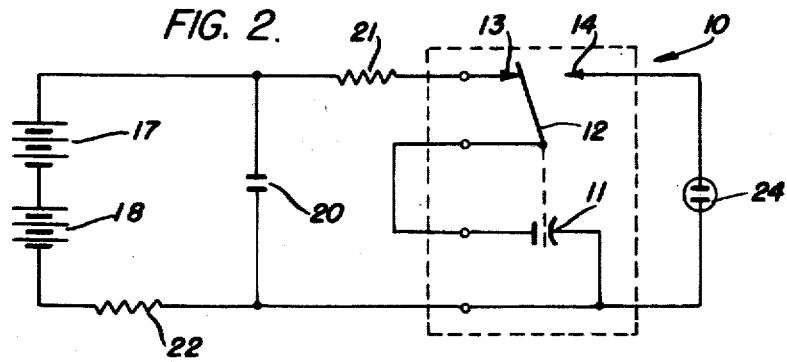
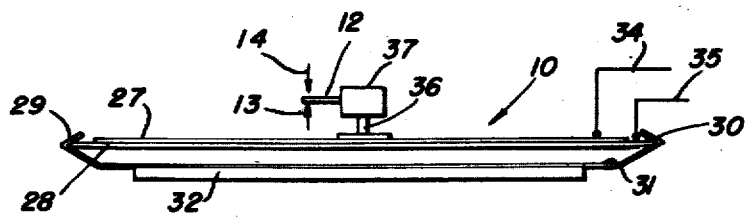
JOSEPH W. CROWNOVER
INVENTOR
BY
ATTORNEY

United States Patent Office

2,802,147
Patented Aug. 6, 1957

2,802,147

ELECTROSTRICTIVE CAPACITIVE RELAY FLASHER CIRCUIT

Joseph W. Crownover, Sherman Oaks, Calif., assignor, by mesne assignments, to Electric Machinery Mfg. Company, a corporation of Minnesota Application August 30, 1954, Serial No. 452,986

10 Claims. (Cl. 315—209)

This invention relates to electrical control circuits having incorporated therein a circuit component constituted by an electrostrictive capacitive actuator which may preferably be in the form of a relay, and particularly electrical circuits wherein the same energy which serves to operate the actuator is stored therein and is then utilized to perform a separate useful function. The electrostrictive capacitive relay has the characteristic as distinguished from electromagnetic relays that rather than being responsive to a rate of flow of electrical energy, it is responsive to an accumulation of energy therein regardless of its rate of flow, and this invention provides for utilization of this energy after it has served the purpose of operating the relay or other actuator. The electrostrictive capacitive relay as a circuit component, is essentially a capacitor, and it operates in response to energy on charging of the capacitor. This energy remains stored in the device, and upon operation in the reverse direction this energy is available upon discharge, to be used for other useful purposes.

In the past, electromechanical transducers, that is, devices such as motors, relays, loudspeakers, etc., which transform electrical energy into mechanical energy, have been limited almost entirely to electromagnetic principles for their operation. In regard to electromagnetic relays as pointed out above, they of course operate in response to a rate of flow of electrical energy. Whenever they are energized there is, of course, a steady utilization of energy which is of course not recoverable. Whenever electromagnetic relays are utilized for switching operations of any magnitude, or wherein a considerable number of relays are utilized, such as in involved automatic control systems, the power necessary for operation of the relay components becomes considerable. The dissipation of such energy is principally by way of heating, which frequently becomes a serious problem in connection with electromagnetic relays. The present invention largely overcomes the deficiencies of the prior art in that, as pointed out, the electrostrictive capacitive relay responds to an accumulation of rather than a rate of flow of energy, and more especially, that this energy need not be dissipated as heat but is utilized for auxiliary or additional purposes upon reverse operation, that is, discharge of the capacitive element. The invention is exemplified, as will be pointed out hereinafter, in an automatic flasher circuit. The principle is, of course, fairly applicable in more complicated and involved circuitry where enlarged numbers of relay components may be utilized. The power requirements in such a system utilizing the present invention, are considerably less, the problem of heating is overcome, and particularly the energy for operating the relay components is available for further utilization.

The electrostrictive capacitive relay component of the circuit is a device utilizing certain high dielectric ceramic materials such as barium titanate. These high dielectric materials have the characteristic of possessing a high degree of electrostrictivity. That is, they exhibit a relatively large dimensional change when subjected to an electrostatic field. This electrostrictive characteristic, that is, the deformation in response to the application of an electrostatic field, is proportional to the square of the impressed electric field, so that the deformation is independent of the polarity of the applied field. This characteristic is clearly distinguished therefore, from the phenomena, that is, the piezoelectric effect, wherein the deformation or dimensional change is proportional to the first power of the applied electric field, and the direction of the dimensional change is accordingly dependent on the polarity. The ceramic materials used in the electrostrictive capacitive relay are particular materials which retain only an insignificant remanent polarization charge, that is, they do not become significantly polarized, and the piezoelectric effect is negligible; the predominant characteristic exhibited as pointed out above, is an electrostrictive effect wherein the operation of the relay component is independent of the polarity of the applied field. Thus, for initial actuation of the relay component, a field of either polarity may be applied, and upon reverse operation of the relay component, that is, upon discharge of the capacitive element, the energy stored therein can be transferred and delivered to any other suitable electrical device for operation thereof. The electrostrictive capacitive relay components used herein may be of the type disclosed in my earlier applications, Serial No. 357,132, filed May 25, 1953, or Serial No. 380,875, filed September 17, 1953.

In accordance with the foregoing, it is an object of the invention to provide electrical control circuits utilizing a component in the form of an electrostrictive capacitive actuator wherein the energy stored in the actuator may be utilized for other purposes.

Another object of the invention is to provide a circuit as in the foregoing object, wherein the electrostrictive capacitive actuator is in the form of an electrical relay which transfers contacts upon charging of the capacitive element, and upon transfer of the contacts the capacitive element discharges through an electrical device which may for example be a flasher tube.

Another object of the invention is to provide an electrical circuit having incorporated therein as a component, an electrostrictive capacitive actuator, the circuit including a condenser in parallel with the actuator, and an electrical device arranged to have both the electrostrictive capacitive element and the condenser discharge therethrough.

Another object of the invention is to provide a circuit as in the foregoing, wherein the electrical device is a flasher tube operated by energy discharged from the electrostrictive capacitive element and the condenser.

Further objects and numerous of the advantages of the invention will become apparent from the following detailed description and annexed drawings, wherein:

Fig. 1 is a circuit diagram of a preferred form of the invention;

Fig. 2 is a circuit diagram of a modified form of the invention; and

Fig. 3 is a diagrammatic view of an electrostrictive capacitive relay as used in the circuit of the other figures.

In the description hereinafter, the invention has been exemplified by way of an electrical circuit comprising an automatic neon tube flasher system. The circuit as disclosed, is representative of any electrical circuit wherein, as will be explained, the energy accumulated in the electrostrictive capacitive element may be utilized to operate an auxiliary electrical device.

In Fig. 1 the electrostrictive capacitive actuator is designated at 10, and as shown, is in the form of an electrical relay as schematically illustrated in Fig. 3. The relay comprises an electrostrictive capacitive actuator element 11 which actuates a switch blade 12 between electrical contacts 13 and 14. As shown, the relay is of the single pole double-throw type. In the discharged position of the capacitive element 11 the pole or blade 12 engages the contact 13. When the element 11 is charged, the pole 12 engages the contact 14, and upon discharge it moves back to contact 13.

The power supply in the circuit shown by way of example, comprises dry cell batteries 17 and 18, and the element 11 is connected across this power supply as shown. In parallel with the capacitive element 11 and across the power supply is a condenser 20. In the charging circuit of the element 11 is a fixed resistor 21, and in the charging circuit of the condenser 20 is a fixed resistor 22. The electrostrictive capacitive element charges through the resistor 21, the time delay before its actuation depending of course on its capacitance, the resistance of resistor 21 and the voltage provided by the batteries 17 and 18.

Numeral 24 designates a neon flasher tube of a type well known in the art, which is adapted to become conducting and to flash when a suitable voltage is placed across it. The tube 24 is connected to contact 14 of relay 10 and may be placed across the electrostrictive capacitive element 11 as will be described.

The electrostrictive capacitive relay is shown in detail in Fig. 3. It comprises an electrostrictive ceramic element 27 which is bonded to a flexible metallic electrode strip 28. The electrode 28 is mounted at its ends between flexible clips or brackets 29 and 30, upstanding from a transverse member 31. The member 31 is suitably attached to a base 32. The electrostrictive element 27 has an electrode formed on its opposite face, preferably by simply having the electrode painted thereon with silver paint. The element 27 therefore has electrodes on its opposite faces to which electrical connections are made, as shown at 34 and 35. Thus, the elements 27 and 28, and their electrical connections, constitute the actuator as shown at 11 in Fig. 1. In operation, when a voltage is applied across the electrostrictive element it expands in its thickness dimension and contracts along its longitudinal dimension. By virtue of its being bonded to the member 28 the dimensional change results in bowing or flexure of the unit such that a physical displacement takes place at its mid-point. Attached to the mid-point of the unit by a stem 36 is a snap action mechanism designated schematically at 37. The snap action mechanism 37 may be of various types and may be of the snap spring type. The mechanism 37 operates the blade or pole 12 between the contacts 13 and 14 with a snap action.

In the operation of the circuit the capacitive element 11 charges in the manner described, and this might of course be by way of an accumulation of charge at a very slow rate of flow. Upon becoming fully charged the relay 10 transfers its contacts with a snap action, the pole 12 engaging the contact 14. When this happens, the capacitive element 11 discharges through these contacts and through the neon flasher tube 24 which provides a flashing signal. Condenser 20 discharges through the flasher tube 24 at the same time, the combined discharge being sufficient to provide a substantial flashing effect. It can be seen therefore that the stored energy in the capacitive element 11 is utilized in the flasher tube 24, and by reason of this utilization of energy the condenser 20 may be considerably smaller.

The number of units as shown at 11 may of course be multiplied for larger switching applications where more power is involved. It will be observed also that in more complex circuits such as complicated control circuits where many relay units may be involved, the energy stored in each of the units may be utilized usefully in the manner disclosed herein.

In the modified circuit of Fig. 2 all of the components are similar to those of Fig. 1, the circuitry however being slightly different. In Fig. 2 the charging circuit for the capacitive element 11 is through the deenergized position contact 13 of the relay 10. Thus, the capacitive element 11 charges similarly through the resistor 21 but through the contact 13. Upon actuation of the relay 10 the pole 12 transfers to the contact 13 and the capacitive element 11, similarly to the operation of Fig. 1 discharges through the flasher tube 24. The capacitive element 11 is now completely disconnected from the batteries 17 and 18 and it becomes the sole power supply for the flasher 24. In Fig. 2 therefore, as can be observed, the batteries 17 and 18 constitute a power supply for the relay 10 which, upon transfer of its contacts, is disconnected from the battery power supply, and it then itself becomes the power supply for the auxiliary device 24 which, as shown, is in the form of a flasher tube. As will be observed therefore, the relay does not respond to a rate of flow of energy as in electromagnetic relays. There is no continuous utilization of power; in fact, there is an accumulation of energy which causes the relay to be actuated, and upon transfer of the relay contacts this energy is itself utilized. The foregoing is representative of preferred forms of the invention. It is to be understood that many modifications and variations thereof will occur to those skilled in the art, and it is intended that all such modifications and equivalents fall within the spirit and scope of the claims appended hereto.

I claim:

1. In an electrical control circuit, in combination: an actuator of the type embodying an electrostrictive capacitive element adapted to operate upon the accumulation of electrical charge thereon; a source of electrical energy; means including electrical contacts operable by the actuator; and means including an electrical device controlled by said contacts and adapted to be operated by energy discharged by said electrostrictive capacitive element.

2. The structure of claim 1, wherein said electrical device is a flasher tube.

3. The structure of claim 1 including a condenser connected across said energy source, whereby upon actuation of said electrical contacts said condenser and said electrostrictive capacitive element discharge in parallel through said electrical device.

4. The structure of claim 1, wherein the source of electrical energy is a battery.

5. In a flasher circuit, in combination: a source of electrical energy; an electrical relay of the type embodying an electrostrictive capacitive actuator; electrical contacts operable by said relay; a flasher tube controlled by said contacts; and circuit means whereby upon actuation of said contacts said electrostrictive capacitive element discharges through said flasher tube.

6. In apparatus of the character described, in combination: means comprising an actuator of the type embodying an electrostrictive capacitive element; means forming a charging circuit for said element; means forming a discharge circuit for said element; and means comprising an electrical device in said discharge circuit adapted to be operated by discharge of said electrostrictive capacitive element and to thereby perform a useful function.

7. In apparatus of the character described, in combination: means comprising an electrical relay of the type embodying an electrostrictive capacitive element; means forming a charging circuit for said element; means forming a discharge circuit for said element, said relay having contacts controlling said discharge circuit; and means comprising an electrical device in said discharge circuit adapted to be operated by discharge of said electrostrictive capacitive element and to thereby perform a useful function.

8. In apparatus of the character described, in combination: means comprising a relay of the type embodying an electrostrictive capacitive element; means forming a charging circuit for said element, said relay having contacts controlling said charging circuit; means forming a discharge circuit for said element; and means comprising an electrical device in said discharge circuit adapted to be operated by discharge of said electrostrictive capacitive element and to thereby perform a useful function.

9. In apparatus of the character described, in combination: means comprising a relay of the type embodying an electrostrictive capacitive element; means forming a charging circuit for said element, said relay having contacts controlling said charging circuit; means forming a discharge circuit for said element, said relay having contacts controlling said discharge circuit; and means comprising an electrical device in said discharge circuit adapted to be operated by discharge of said electrostrictive capacitive element and to thereby perform a useful function.

10. In apparatus of the character described, in combination: means comprising a relay of the type embodying an electrostrictive capacitive element; means forming a charging circuit for said element; means forming a discharge circuit for said element; electrical contact means adapted to cause said element to discharge through said discharge circuit; and means forming a load device in said discharge circuit adapted to be operated by discharge of said electrostrictive capacitive element.

References Cited in the file of this patent
UNITED STATES PATENTS

| | | |
|---|---|---|
| 2,096,916 | Pook | Oct. 26, 1937 |
| 2,259,570 | Klumb | Oct. 21, 1941 |
| 2,471,967 | Mason | May 31, 1949 |
| 2,674,726 | Williams | Apr. 6, 1954 |

UNITED STATES PATENT OFFICE
CERTIFICATE OF CORRECTION

Patent No. 2,802,147                                                          August 6, 1957

Joseph W. Crownover

It is hereby certified that error appears in the printed specification of the above numbered patent requiring correction and that the said Letters Patent should read as corrected below.

Column 2, line 27, for "Serial No. 380,875" read --Serial No. 380,785--.

Signed and sealed this 7th day of October 1958.

(SEAL)

Attest:
KARL H. AXLINE
Attesting Officer

ROBERT C. WATSON
Commissioner of Patents